United States Patent [19]

Nozawa et al.

[11] 4,106,365

[45] Aug. 15, 1978

[54] POWER TRAIN ARRANGEMENT FOR SURFACE-HANDLING VEHICLE

[75] Inventors: Koji Nozawa; Motoichi Ohba, both of Tokyo, Japan

[73] Assignee: Nissan Motor Company, Limited, Yokohama, Japan

[21] Appl. No.: 784,721

[22] Filed: Apr. 5, 1977

[30] Foreign Application Priority Data

Apr. 6, 1976 [JP] Japan .............................. 51-43097[U]

[51] Int. Cl.$^2$ ............................................. F16H 37/00
[52] U.S. Cl. ...................................................... 74/740
[58] Field of Search ..................... 74/740, 665 A, 745

[56] References Cited
U.S. PATENT DOCUMENTS

| | | | |
|---|---|---|---|
| 2,899,834 | 8/1959 | Polowski | 74/745 X |
| 3,906,817 | 9/1975 | Kreitzberg | 74/740 |

*Primary Examiner*—Samuel Scott
*Assistant Examiner*—Frank H. McKenzie, Jr.
*Attorney, Agent, or Firm*—Bacon & Thomas

[57] ABSTRACT

A power train arrangement for a powered surface-handling vehicle such as a fork lift truck, comprising a manually operated power transmission mechanism and a differential reduction gear unit including an axle housing accommodating a differential gear assembly and connected to the transmission casing by an axle carrier which is separate from and fixedly but detachably connected to the transmission casing and the axle housing, wherein the relative positions of the axle carrier and the differential gear assembly can be inverted without destroying the driving connection from the transmission mechanism to the differential gear assembly so that the differential reduction gear unit is compatible with wheel tires having different diameters.

5 Claims, 6 Drawing Figures

POWER TRAIN ARRANGEMENT FOR SURFACE-HANDLING VEHICLE

The present invention relates to powered industrial surface-handling vehicles and, particularly, to a power train arrangement of a powered industrial surface-handling vehicle such as for example a powered fork lift truck.

Fork lift trucks or any other types of powered industrial surface-handling vehicles use either pneumatic tires or cushion-type solid tires depending upon the natures of the operations which are to be performed by such vehicles and/or the conditions of the surfaces on which the vehicles are to operate. As is well known in the art, however, pneumatic and cushion-type solid tires for use in vehicles with the same unloaded weight generally differ in diameter. For a fork lift truck having an unloaded weight of two metric tons, for example, the optimum radii of the tires are about 330 millimeters for pneumatic tires and 260 millimeters for cushion-type solid tires. If, therefore, cushion-type solid tires are used in a fork lift truck which is tailored to pneumatic tires, the under-clearance of the fork lift truck is reduced by the difference between the respective radii of the pneumatic and solid tires and brings about various problems.

The under-clearances of vehicles in general are dictated by the radii of the tires used for the vehicles and accordingly by the heights of the axle shafts supported by the road wheels equipped with the tires. If, therefore, the heights of the axle shafts and the final drive unit connected to the axle shafts are altered or re-adjusted appropriately, then the under-clearance of a fork lift truck could be maintained unchanged even when the diameters of the tires for use in the fork lift truck are changed. In a fork lift truck in which the final drive unit is integral with the transmission casing which is held in a predetermined relative position to the power plant of the truck, however, the relative position of the final drive unit to the transmission casing is unchangeable and as a consequence cannot be raised or lowered without respect to the relative position of the transmission casing to the power plant. For this reason, manufacturers of fork lift trucks or other types of industrial surface-handling vehicles are compelled to design and engineer final drive units respectively tailored to pneumatic and cushion-type solid tires. This apparently gives rise to an increase in the number of component parts to be offered by the manufactures, resulting in added complications in the control of the inventory and raising the production cost of each individual vehicle. The present invention contemplates elimination of these problems which have thus far been inherent in the conventional power train arrangement of powered industrial surface-handling vehicles.

It is, accordingly, an important object of the present invention to provide an improved power train arrangement which is compatible with both a surface-handling vehicle using pneumatic tires and a surface-handling vehicle using cushion-type solid tires.

It is another important object of the present invention to provide an improved vehicle power train arrangement which is readily convertible between a condition compatible with a surface-handling vehicle using pneumatic tires and a condition compatible with a surface-handling vehicle using cushion-type solid tires.

It is still another important object of the present invention to provide an improved vehicle power train arrangement consisting of a transmission mechanism and a final drive unit which can be readily re-arranged for a raised or lowered position relative to and independently of the transmission mechanism.

Yet, it is another important object of the present invention to provide an improved vehicle power train arrangement which will contribute to reduction of the production cost of a surface-handling vehicle and to alleviation of the complexity in the control of the inventory of component parts for the production of the surface-handling vehicle.

In accordance with the present invention, these and other objects are accomplished in a power train arrangement which comprises, in combination, a power transmission mechanism including a transmission output shaft and a transmission casing having a vertical wall portion, and a differential reduction gear unit including a drive gear connected to the transmission output shaft and rotatable about a fixed center axis substantially normal to the above-mentioned wall portion of the transmission casing, an axle housing accommodating therewithin a differential gear assembly which is rotatable in its entirety about an axis of rotation non-intersecting and substantially perpendicular to the center axis of the drive gear, the differential gear assembly including a driven gear which is in mesh with the above-mentioned drive gear and which is rotatable about the aforesaid axis of rotation of the gear assembly, an axle carrier including a first wall portion which is fixedly but detachably attached to the axle housing and a second wall portion having an outer contour which is symmetrical with respect to an axis substantially in line with the center axis of the aforesaid drive gear, and a plurality of fastening elements fixedly but detachably connecting the second wall portion of the axle carrier to the above-mentioned vertical wall portion of the transmission casing and arranged substantially symmetrically with respect to the above-mentioned axis of the second wall portion of the axle carrier, the axle carrier being reversible in vertical position relative to the transmission casing and the differential gear assembly being reversible in the axial direction thereof for having the aforesaid axis of rotation thereof located on a plane parallel with and higher or lower by a predetermined distance than the center axis of the drive gear. By reference, the first wall portion of the axle carrier may have an outer contour which is symmetrical with respect to an axis substantially parallel with the center axis of the drive gear and substantially perpendicularly intersecting the axis of rotation of the differential gear assembly, the first wall portion of the axle carrier being attached to the axle housing by means of a plurality of fastening elements which are arranged substantially symmetrically with respect to the above-mentioned axis of the first wall portion. If desired, furthermore, the transmission mechanism in the above described power train arrangement may further comprise forward-reverse selecting means having different angular positions operative to produce rotation of the transmission output shaft in opposite directions about the center axis of the shaft, gearshift means movable responsive to the movements of the forward-reverse selecting means between the above-mentioned different angular positions thereof, and motion inverting means intervening between the forward-reverse selecting means and the gearshift means for inverting the directions of movements of the gearshift means in response to the movements of the gearshift means. The first wall portion of the axle carrier is preferably constituted by a substantially elliptical flange having a major axis on the aforesaid plane and a center axis which is coincident with the aforesaid axis of the first wall portion. Likewise, the second wall portion of the axle carrier is preferably constituted by a substantially circular flange having a center axis which is coincident with the above-mentioned axis of the second wall portion.

The features and advantages of a vehicle power train arrangement for use in a powered surface-handling vehicle according to the present invention will be more clearly understood from the following description taken in conjunction with the accompanying drawings, in which.

Figure 1:
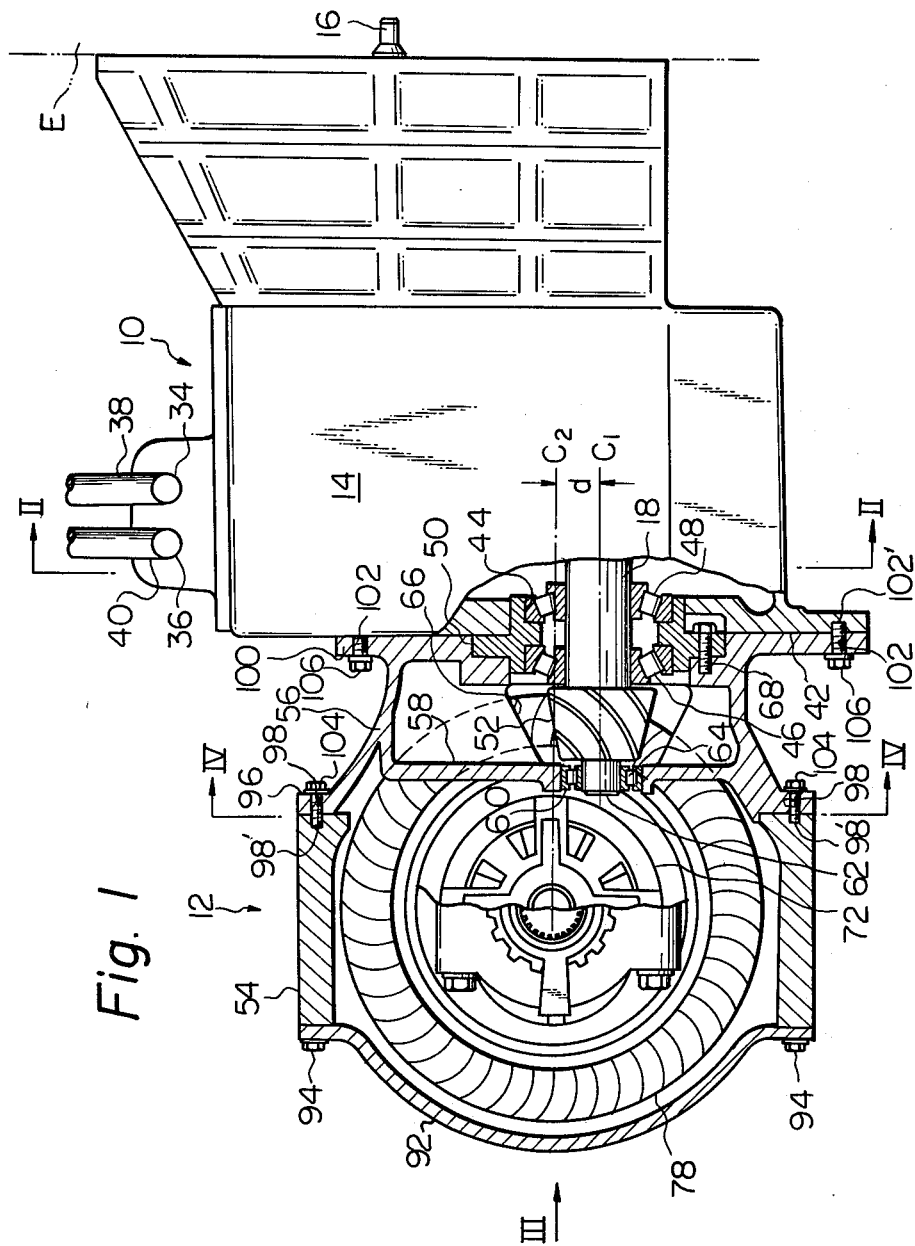
FIG. 1 is a sectional view showing, partially in side elevation, a preferred embodiment of the vehicle power train arrangement according to the present invention, the sectional view being taken in a fore-and-aft direction of a fork lift truck in which the power train arrangement is assumed to be incorporated.
Figure 2:
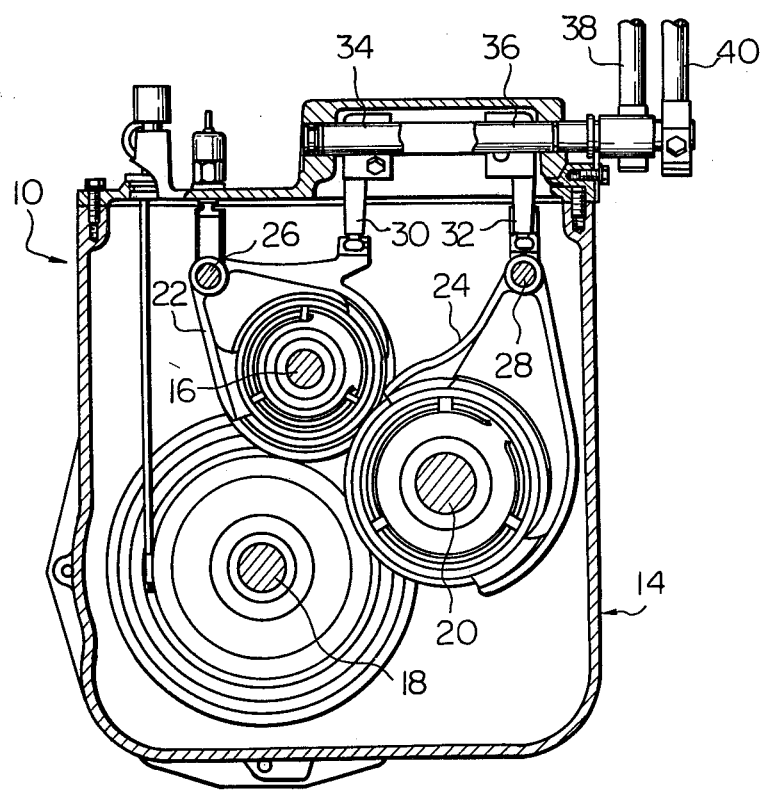
FIG. 2 is a vertical sectional view showing a power transmission mechanism forming part of the power train arrangement of FIG. 1 as viewed from a vertical plane which is indicated by line II—II of FIG. 1.
Figure 5:
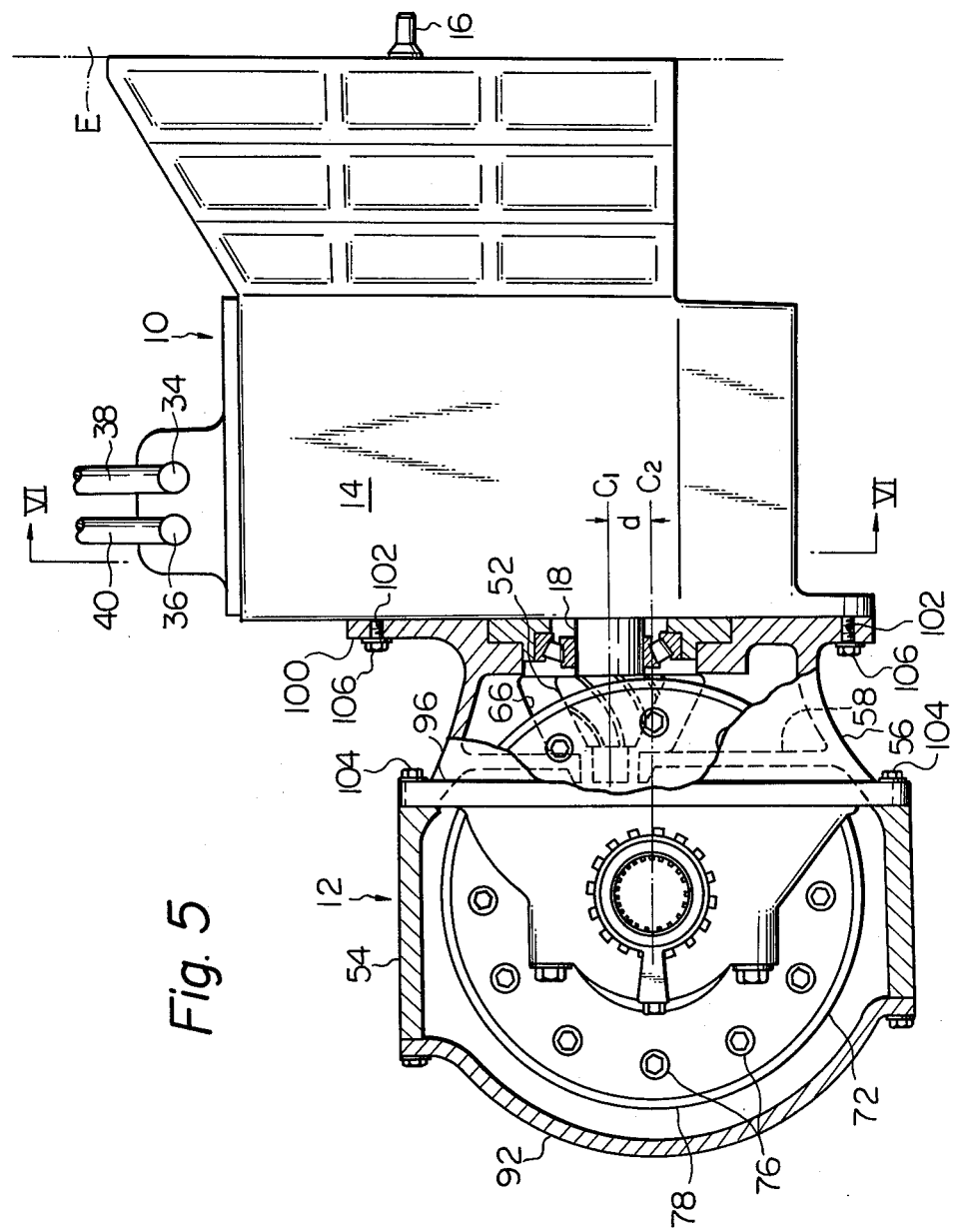
Figure 6:
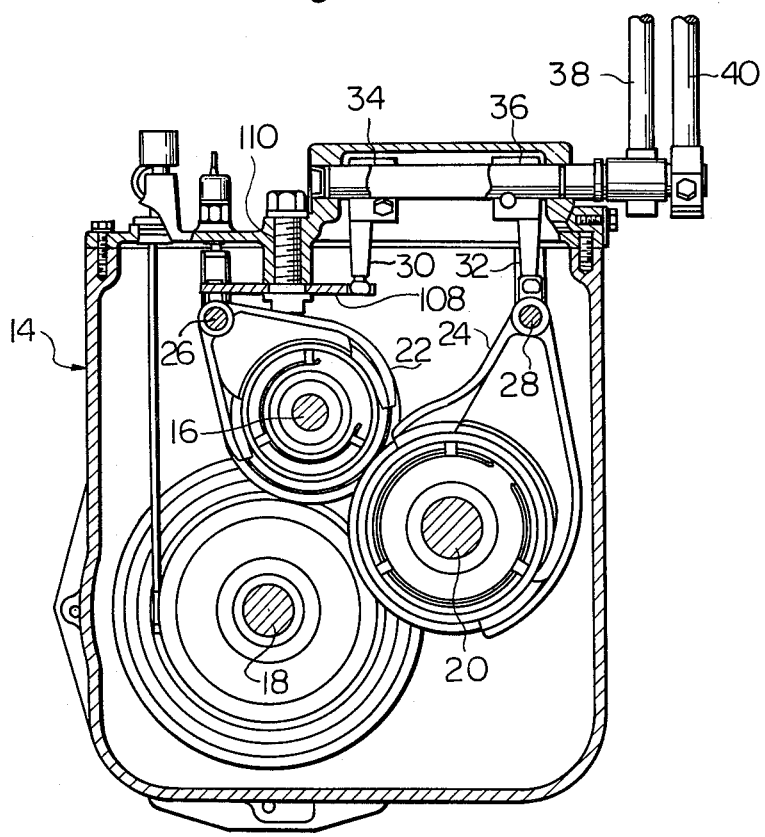

FIG. 5 is a view similar to FIG. 1 but shows the power train arrangement in which the differential gear assembly and the axle housing forming part of the differential gear unit of the power train arrangement are held in lower positions to be compatible with tires having reduced diameters; and FIG. 6 is a view similar to FIG. 2 but shows a power transmission mechanism incorporating gearshift control arrangement adapted for use with the power train arrangement illustrated in FIG. 5, the transmission mechanism being viewed backwardly from a vertical plane which is indicated by line XI–XI in FIG. 5.

Referring to FIG. 1 of the drawings, a power train arrangement embodying the present invention is assumed to be incorporated into a powered fork lift truck and largely comprises a manually-shifted power transmission mechanism 10 and a differential reduction gear unit 12 serving as a final drive unit in the power train. The power transmission mechanism 10 includes a transmission casing 14 fixedly mounted on the body structure (not shown) of a fork lift truck and a horizontal transmission input shaft 16 which is connected to the output shaft (not shown) of a suitable power plant such as for example an internal combustion engine E. As is schematically illustrated in FIG. 2, the transmission mechanism 10 comprises, in addition to the transmission casing 14 and the input shaft 16, a transmission output shaft 18 and an idler shaft 20 which are substantially parallel with the transmission input shaft 16 and a gear train consisting of a plurality of spur gears which are mounted on the shafts 16, 18 and 20. The gears on the input shaft 16 and the idler shaft 20 are splined to the respective shafts 16 and 20 and are connected to shifter forks 22 and 24, respectively. The shifter forks 22 and 24 are axially slidable on guide bars 26 and 28, respectively, which extend in parallel with the gear carrier shafts 16, 18 and 20, each of the guide bars 26 and 28 being fixedly connected at both ends thereof to the transmission casing 14. The shifter forks 22 and 24 are connected by means of ball-and-socket joints to control arms 30 and 32 secured to parallel control rods 34 and 36, respectively, which are rotatable on the transmission casing 14 about their respective center axes. The control rods 34 and 36 in turn are connected to a forward-reverse selector lever 38 and a gearshift lever 40, respectively, which are rotatable with the rods 34 and 36, respectively, about the respective center axes of the rods. When the forward-reverse selector lever 38 is manually operated to turn in either direction about the center axis of the control rod 34, then the control rod 34 and accordingly the control arm 30 thereon are driven to turn about the center axis of the rod 34 and move the associated shifter forks 22 in parallel with the guide bar 26 in either direction. This causes the gears on the transmission input shaft 16 to move on the shaft 16 and either directly mesh with the gears on the transmission output shaft 18 or engage the gears on the shaft 18 through the gears on the idler shaft 20. If, thus, the transmission input shaft 16 is being driven to rotate about the axis thereof by the engine E, the transmission output shaft 18 is rotated in either direction about the axis thereof. The gear ratio thus achieved between the gears on the transmission input and output shafts 16 and 18 is dictated by the axial positions of the gears on the input shaft 16 relative to the gears on the output shaft 18 or the axial positions of the gears on the input and idler shafts 16 and 20 relative to the gears on the output shaft 18. The axial positions of the gears on the idler shaft 20 relative to the gears on the output shaft 18 are varied by moving the shifter fork 28 from the associated gearshift lever 40.

As is seen in FIG. 1, the transmission casing 14 has a vertical front wall portion 42 formed with an opening 44. The transmission output shaft 18 projects outwardly from the front wall portion 42 of the transmission casing 14 through this opening 44 and is carried in roller bearings 46 and 48 which are fitted in a bearing retainer 50 fast on the wall portion 42. The transmission output shaft 18 has mounted on its front end portion projecting from the wall portion 42 of the transmission casing 14 a drive pinion gear 52 which is constituted by a coned hypoid gear and which has a horizontal axis of rotation in line with the axis of rotation of the transmission output shaft 18, the axis of rotation of the drive pinion being indicated by $C_1$.

On the other hand, the differential reduction gear unit 12 comprises, in addition to the abovementioned drive pinion gear 52 which is thus mounted on the transmission output shaft 18, a hollow axle housing 54 and a hollow axle carrier 56. The axle housing 54 is of the so-called banjo or separable carrier type and is fixedly but detachably connected at its rear end to the axle carrier 56 which is likewise fixedly but detachably mounted on the outer face of the front wall portion 42 of the transmission casing 14, as will be described in more details as the description proceeds. The axle carrier 56 has a vertical front wall portion 58 which is forwardly spaced apart substantially in parallel from the outer face of the front wall portion 42 of the transmission casing 14, enclosing the drive pinion gear 52 on the transmission output shaft 18. The front wall portion 58 of the axle carrier 56 is formed with a circular opening 60 having a center axis which is substantially in line with the axis of rotation $C_1$ of the drive pinion gear 52 on the shaft 18. The transmission output shaft 18 has formed at its leading end next to the front end of the drive pinion gear 52 a boss 62 which is rotatably carried in a pilot bearing 64 received in the opening 60 thus formed in the front wall portion 58 of the axle carrier 56. The axle carrier 56 further has a side wall portion formed with an opening 66 through which the drive pinion gear 52 on the transmission output shaft 18 partially and sidewise protrudes from the axle carrier 56. The above-mentioned bearing retainer 50 supporting the bearings 46 and 48 for the transmission output shaft 18 is fixedly secured to the axle carrier 56 by suitable fastening means such as bolts one of which is indicated at 68.

Figure 3:
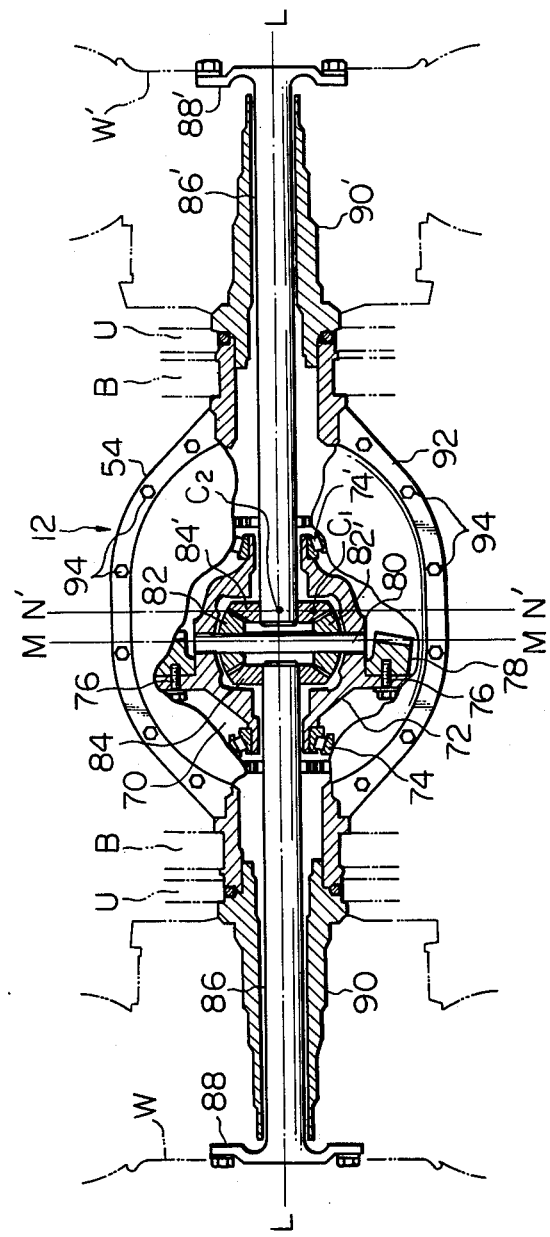
FIG. 3 is a partially cut-away vertical sectional view of a differential reduction gear unit serving as a final drive unit in the power train arrangement illustrated in FIG. 1, the gear unit being viewed backwardly from the front of the power train arrangement as indicated by arrow III in FIG. 1.

As is better seen in FIG. 3, the axle housing 54 has accommodated therewithin a differential gear assembly 70 comprising a generally drum-shaped differential case 72 which is carried in side roller bearings 74 and 74' in the axle housing 54 so as to be rotatable relative to the axle housing 54 about a horizontal axis L—L which is non-intersecting and perpendicular to the axis $C_1$ of rotation of the drive pinion gear 52. The differential case 72 has fixedly mounted thereon by suitable fastening means such as bolts 76 a hypoid ring gear 78 which is rotatable with the differential case 72 about the above-mentioned axis L—L. As will be seen from FIG. 1, the ring gear 78 is in mesh with the drive pinion 52 sidewise partially protruding out of the axle carrier 56 through the opening 66 in the side wall portion of the carrier. The differential case 72 has fixedly mounted thereon a differential pinion shaft 80 having a center axis M—M perpendicular to and intersecting the horizontal axis L—L of rotation of the differential case 72. On the differential pinion shaft 80 are assembled two spaced parallel differential pinion gears 82 and 82' which are housed within the differential case 72. The differential pinion gears 82 and 82' are rotatable about the center axis M—M of the pinion shaft 80 relative to the differential case 72 and are revolvable together with the pinion shaft 80 and the differential case 72 about the axis of rotation L—L of the differential case 72 relative to the axle housing 54. The differential pinion gears 82 and 82' are in mesh with differential side gears 84 and 84' which are also housed within the differential case 72 and which are spaced apart in parallel from each other across the pinion shaft 80. The side gears 84 and 84' are rotatable relative to the differential case 72 about the axis of rotation L—L of the case 72 and are respectively splined to inner axial end portions of horizontal axle shafts 86 and 86' laterally extending in opposite directions from the differential case 72 and rotatable about respective axes which are in line with the axis of rotation L—L of the differential case 72. The axle shafts 86 and 86' have flanges 88 and 88' at their respective outer ends are securely connected to the left and right drive wheels W and W', respectively, of the fork lift truck. For convenience of designing and engineering the differential assembly 70, the axle shafts 86 and 86' have different lengths and accordingly the center point between the inner ends of the axle shafts 86 and 86' is located off the center point in lateral direction of the axle housing 54. The axle housing 54 is fixedly but detachably connected at both side ends to axle tubes 90 and 90' enclosing the axle shafts 86 and 86', respectively. The axle housing 54 has the vehicle body B supported on its side wall portions while the axle tubes 90 and 90' has the uprights U forming part of the load lifting setups of the fork lift truck. To provide access to the differential gear assembly 70 within the axle housing 54, the axle housing 54 has fixedly but detachably attached to the front end edge thereof a front cover 92 by suitable fastening means such as bolts 94, as shown in FIG. 1.

Figure 4:
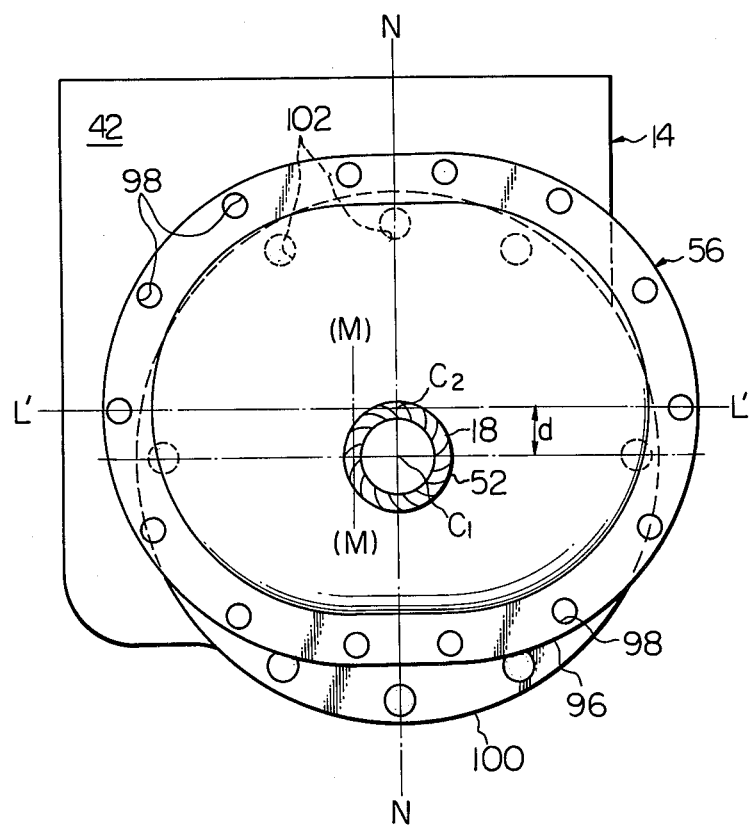
FIG. 4 is a schematic front plan view showing the construction of an axle carrier forming part of the differential reduction gear unit of the power train arrangement illustrated in FIG. 1, the axle carrier being viewed backwardly from a vertical plane indicated by line IV—IV.

Referring to FIG. 4 as well as FIGS. 1 and 2, the axle carrier 56 has an elliptical front flange portion 96 formed with a plurality of tapped holes 98 and a circular rear flange portion 100 formed with a plurality of tapped holes 102. The circular rear flange portion 100 has a horizontal center axis which is substantially in line with the axis of rotation $C_1$ of the drive pinion gear 52 on the transmission output shaft 18 and accordingly with the center axis of the circular opening 60 in the front wall portion 58 of the axle carrier 56. On the other hand, the elliptical front flange portion 96 has a horizontal major axis L'—L' and a vertical minor axis N—N and a horizontal center axis $C_2$ perpendicular to the major and minor axes L'—L' and N—N at the intersection of the axes. The center axis $C_2$ of the elliptical front flange portion 100 perpendicularly intersects the axis of rotation M—M of the differential case 72 and accordingly the aligned axes of rotation of the axle shafts 86 and 86' (FIG. 3). The respective center axes of the front and rear flange portions 96 and 100 and accordingly the minor axis N—N of the elliptical front flange portion 96 are contained in the same vertical plane N'—N' passing through the previously mentioned center point in lateral direction of the axle housing 54 (FIG. 3) and the horizontal plane containing the major axis L'—L' of the elliptical front flange portion 96 is located above the horizontal plane containing the center axis of the circular rear flange portion 100 and accordingly the axis of rotation $C_1$ of the drive pinion gear 52 on the transmission output shaft 18. Thus, the horizontal plane containing the center axis $C_2$ of the elliptical front flange portion 96 is located above the horizontal plane containing the axis of rotation $C_1$ of the drive pinion gear 52 and is upwardly spaced apart a predetermined distance d from the latter as indicated in FIGS. 1 and 4. The tapped holes 98 in the elliptical front flange portion 96 are disposed symmetrically with respect to the center axis $C_2$ of the flange portion 96 and, likewise, the tapped holes 102 in the circular rear flange portion 100 are disposed symmetrically with respect to the center axis of the flange portion 100, as shown in FIG. 4. The axle housing 54 has formed in its rear end edge tapped holes 98' which are arranged conformingly to the tapped holes 98 in the elliptical front flange portion 96 of the axle carrier 56 and, likewise, the front wall portion 42 of the transmission casing 14 is formed with tapped holes 102' (only one of which is seen in FIG. 1) which are arranged conformingly to the tapped holes 102 in the circular rear flange portion 100 of the axle carrier 56. The front flange portion 96 is fixedly but detachably connected to the axle housing 54 by externally threaded fastening elements such as bolts 104 which are respectively passed through the tapped holes 98 in the flange portion 96 into the tapped holes 98' in the axle housing 54 and, likewise, the rear flange portion 100 is fixedly but detachably connected to the front wall portion 42 of the transmission casing 14 by externally threaded fastening elements such as bolts 106 which are respectively passed through the tapped holes 102 in the flange portion 100 into the tapped holes 102' in the front wall portion 42 of the transmission casing 14 as illustrated in FIG. 1.

The axle housing 54 being connected to the transmission casing 14 by means of the axle carrier 56 thus constructed and arranged, the axle shafts 86 and 86' are held at a level higher than the level on which the center axis of the drive pinion 52 on the transmission output shaft 18 so that the fork lift truck has a minimum under clearance which is proper to pneumatic tires. If it is desired to use cushion-type solid tires having smaller diameters in lieu of the pneumatic tires, the differential reduction gear unit 12 having the hereinbefore described construction can be rearranged to be compatible with the cushion-type solid tires simply by inverting the respective vertical position of the axle carrier 56 and the axial direction of the differential gear assembly 70 inclusive of the ring gear 78, as illustrated in FIG. 5. With the respective positions of the axle carrier 56 and the differential gear assembly 70 thus inverted, the horizontal plane containing the center axis $C_2$ of the elliptical front flange portion 96 of the axle carrier 56 is located below the horizontal plane containing the center axis of the circular rear flange portion 100 of the axle carrier 56 and accordingly the center axis $C_1$ of the drive pinion 52 on the transmission output shaft 18 and is accordingly downwardly spaced apart from the latter plane by the predetermined distance $d$. The ring gear 78 is now held in a position symmetric to the initial position illustrated in FIG. 3 with respect to the vertical plane N'—N' passing through the lateral center point of the axle housing 54 so that the directions of the helices of the teeth of the ring gear 78 with respect to the teeth of the drive pinion gear 52 remain unchanged. The drive pinion gear 52 and the ring gear 78 are therefore properly in mesh with each other. The axle shafts 86 and 86' are now lowered by the distance $2d$ from the initial positions above ground so that the differential reduction gear unit 12 is compatible with cushion-type solid tires smaller in diameter than the pneumatic tires.

The differential gear assembly 70 having thus be inverted in lateral position, the mating relationship between the drive pinion gear 52 and the ring gear 78 is also inverted and as a consequence the direction of rotation of the axle shafts 86 and 86' is reversed. The direction of rotation of the drive wheels W and W' is therefore also reversed so that the directions to move the forward-reverse selector lever 38 to effect forward and reverse movements of the fork lift truck must be reversed. To avoid such an inconvenience, the control arrangement for the transmission mechanism 10 may be modified in a manner illustrated in FIG. 6. In the control arrangement shown in FIG. 6, a lever 108 is additionally provided which has an intermediate fulcrum portion rotably mounted on a shaft which is constituted by a bolt securely but adjustably connected to the transmission casing 14. The bolt 110 has a center axis nonintersecting and perpendicular to the guide bar 26 supporting the shifter fork 22 for the gears on the transmission input shaft 16. The lever 108 is pivotally connected at one end to the shifter fork 22 and at the other end connected through a ball-and-socket joint to the control arm on the control rod 34 connected to the forward-reverse lever 38. The directions of movement of the shifter fork 22 to select forward and reverse movements of the fork lift truck are thus reversed from those in the control arrangement for the transmission mechanism 10 illustrated in FIG. 2 so that the axle shafts 86 and 86' are capable of being rotated in directions corresponding to those assigned to the forward-reverse selector lever 38.

If desired, not only the vertical position of the axle carrier 56 and the lateral position of the differential gear assembly 70 but also the lateral positions of the axle housing 54, axle shafts 86 and 86', axle tubes 90 and 90' and front cover 92 may be inverted. In this instance, the relative positions of the axle housing 54 and the axle carrier 56 to each other remain unchanged and, for this reason, the front flange of the axle carrier 56 may be configured as desired if only the rear flange 100 of the carrier 56 has a circular configuration or any other configuration substantially symmetric with respect to a center axis in line with the center axis $C_1$ of the drive pinion gear 52 and is formed with tapped holes 102 which are arranged substantially symmetrically with respect to the center axis of such a configuration.

What is claimed is:

1. A power train arrangement of a powered surface-handling vehicle, comprising
   a power transmission mechanism including a transmission output shaft and a transmission casing having a vertical wall portion, and
   a differential reduction gear unit including a drive gear connected to said transmission output shaft and rotatable about a fixed center axis substantially normal to said wall portion, an axle housing accommodating therewithin a differential gear assembly rotatable in its entirety about an axis of rotation non-intersecting said center axis, said gear assembly including a driven gear in mesh with said drive gear and rotatable about said axis of rotation, an axle carrier including a first wall portion fixedly but detachably attached to said axle housing and a second wall portion having an axis substantially in line with said center axis of said drive gear and an outer contour symmetrical with respect to said axis thereof, and a plurality of fastening elements fixedly but detachably connecting said second wall portion to said wall portion of said transmission casing and arranged substantially symmetrically with respect to said axis of said second wall portion, said axle carrier being reversible in vertical position relative to said transmission casing and said differential gear assembly being reversible in the axial direction thereof for having said axis of rotation located on a plane parallel with and higher or lower by a predetermined distance than said center axis of said drive gear.

2. A power train arrangement as set forth in claim 1, in which said first wall portion of said axle carrier has an axis substantially parallel with said center axis of said drive gear and an outer contour symmetric with respect to said axis thereof and substantially perpendicularly intersecting said axis of rotation of said differential gear assembly, said first wall portion being attached to said axle housing by means of a plurality of fastening elements which are arranged substantially symmetrically with respect to said axis of the first wall portion.

3. A power train arrangement as set forth in claim 1, in which said second wall portion is constituted by a substantially circular flange having a center axis coincident with said axis of the second wall portion.

4. A power train arrangement as set forth in claim 2, in which said first wall portion is constituted by a substantially eliptical flange having a major axis on said plane and a center axis coincident with said axis of the first wall portion.

5. A power train arrangement as set forth in claim 1, in which said transmission mechanism further comprises forward-reverse selecting means having different angular positions operative to produce rotation of said transmission output shaft in opposite directions, gearshift means movable responsive to the movements of the selecting means between said angular positions, and motion inverting means intervening between said selecting means and said gearshift means for inverting the directions of movements of the gearshift means in response to said movements of the gearshift means.

* * * * *